United States Patent
Tang (10) Patent No.: US 9,897,831 B2
(45) Date of Patent: Feb. 20, 2018

(54) BLUE PHASE LIQUID CRYSTAL PANELS

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Yuejun Tang, Guangdong (CN)

(73) Assignees: Shenzhen China Star Optoelectronics Technology Co., Ltd., Shenzhen, Guangdong (CN); WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 261 days.

(21) Appl. No.: 14/785,863

(22) PCT Filed: Sep. 23, 2015

(86) PCT No.: PCT/CN2015/090328
§ 371 (c)(1),
(2) Date: Oct. 21, 2015

(87) PCT Pub. No.: WO2017/045219
PCT Pub. Date: Mar. 23, 2017

(65) Prior Publication Data
US 2017/0153469 A1    Jun. 1, 2017

(30) Foreign Application Priority Data
Sep. 15, 2015    (CN) .......................... 2015 1 0587564

(51) Int. Cl.
*G02F 1/13*    (2006.01)
*G02F 1/1343*    (2006.01)
(Continued)

(52) U.S. Cl.
CPC ............ *G02F 1/1323* (2013.01); *G02F 1/137* (2013.01); *G02F 1/13306* (2013.01);
(Continued)

(58) Field of Classification Search
CPC .. G02F 1/1323; G02F 1/134363; G02F 1/137; G02F 1/13306; G02F 2201/121;
(Continued)

(56) References Cited

U.S. PATENT DOCUMENTS

| | | |
|---|---|---|
| 4,818,076 A | 4/1989 | Heppke |
| 2005/0179847 A1* | 8/2005 | Miyachi ................. C09K 19/02 349/141 |

(Continued)

FOREIGN PATENT DOCUMENTS

| | | |
|---|---|---|
| CN | 102253541 A | 11/2011 |
| CN | 102707528 A | 10/2012 |

(Continued)

OTHER PUBLICATIONS

English translation of CN 102253541 B, Title: Viewing angle controllable blue phase liquid crystal display, Author: Jianpeng Cui; Liwei Liu; Qionghua Wang; Date of publication: Nov. 23, 2011.*

*Primary Examiner* — Edward Glick
*Assistant Examiner* — Shan Liu
(74) *Attorney, Agent, or Firm* — Andrew C. Cheng (57) ABSTRACT

A blue phase liquid crystal panel includes a plurality of pixel cells. Each of the pixel cells comprises a display area and a viewing angle controlling area. The viewing angle controlling area includes a plurality of first electrode pairs spaced apart from each other, and each of the first electrode pairs includes a first pixel electrode1 and a first common electrode. In a wide viewing angle mode, no electrical field is generated by the first electrode pair of the viewing angle controlling area. In a narrow viewing angle mode, a vertical (Continued)

electrical field is generated between the first pixel electrode and the first common electrode of each of the first electrode pairs within the viewing angle controlling area. In this way, the liquid crystal panel may transit between the wide viewing angle mode and the narrow viewing angle mode.

1 Claim, 5 Drawing Sheets

(51) Int. Cl.
  *G02F 1/137* (2006.01)
  *G02F 1/133* (2006.01)

(52) U.S. Cl.
  CPC .............. *G02F 1/134363* (2013.01); *G02F 2001/13793* (2013.01); *G02F 2201/121* (2013.01); *G02F 2201/123* (2013.01)

(58) Field of Classification Search
  CPC ..... G02F 2201/123; G02F 2001/13793; G02F 1/0123; G02F 1/015; G02F 1/136; G02F 1/1362; G02F 1/136277; G02F 2001/13613; G02F 2001/136281; G02F 1/1393; G02F 2001/134372; G02F 1/1343; G02F 1/134309; G02F 1/13439; G02F 1/136286; G02F 1/155; G02F 1/1395; G02F 1/218; G02F 1/134327; G02F 1/133707; G02F 1/134336; G02F 1/0316; G02F 2001/134318; G02F 2001/134381; G02F 2001/134345; G02F 2001/1357; G02F 2001/136218; G02F 2001/136295; G02F 2001/1552; G02F 2001/1555; G02F 2001/1557; G02F 2001/13629; G02F 2201/12; G02F 2201/124; G02F 2201/122; G02F 2201/14; G02F 2202/10; G02F 1/0121; G02F 1/0327; G02F 1/076; G02F 1/133; G02F 1/1345; G02F 1/13452; G02F 1/13454; G02F 1/13458; G02F 2001/133388; G02F 1/133612; G02F 1/13456; G02F 1/136209; G02F 1/136227; G02F 1/1365; G02F 1/1368; G02F 2001/136222; G02F 2001/136231; G02F 2001/13625; G02F 2001/1635; G02F 2001/133612; G02F 2001/13456; G09G 2300/0495; G09G 2300/06; G09G 2300/0866; G09G 3/2944; G09G 3/2946; G09G 2300/08; G09G 3/3648; G09G 2320/068; G09G 2300/0421; G09G 2300/0426; G09G 2300/0439; G09G 3/3659; G09G 2300/0408; G09G 3/3655; G09G 3/3674; G09G 3/3685; G09G 2290/00; G09G 2320/0223; G09G 3/36; H01L 27/02; H01L 27/124; H01L 27/3276; H01L 27/3297; H01L 27/3279; H01L 27/329; H01L 23/49534; H01L 2933/0016; H01L 23/48; H01L 23/49572; H01L 2224/50; H01L 2224/79; H01L 2224/86; H01L 2225/06579; H01L 2225/107; H01L 24/50; H01L 2021/775; H01L 27/1214; H01L 27/2436; H01L 29/66037; H01L 29/66068; H01L 29/66227; H01L 29/72; H01L 29/786; H01L 2924/1304; H01L 51/0504; H01L 51/0508
  USPC .. 349/33, 34, 41, 139–148, 149–152, 42–43
  See application file for complete search history.

(56) References Cited

U.S. PATENT DOCUMENTS

| | | | |
|---|---|---|---|
| 2007/0121047 A1* | 5/2007 | Chung | G02F 1/134363 349/141 |
| 2007/0153196 A1* | 7/2007 | Jang | G02F 1/1323 349/141 |
| 2008/0165297 A1* | 7/2008 | Matsushima | G02F 1/1323 349/33 |
| 2008/0259264 A1 | 10/2008 | Jin | |
| 2008/0273134 A1* | 11/2008 | Kim | G02F 1/1323 349/43 |
| 2011/0051055 A1* | 3/2011 | Lee | G02F 1/1323 349/106 |
| 2012/0327346 A1* | 12/2012 | Tsai | G02F 1/134363 349/138 |
| 2013/0077004 A1* | 3/2013 | Yoso | G02F 1/134363 349/39 |
| 2014/0240628 A1* | 8/2014 | Chen | G02F 1/136209 349/42 |
| 2014/0307213 A1* | 10/2014 | Naganuma | G02F 1/133371 349/139 |
| 2016/0026014 A1 | 1/2016 | Zhao | |
| 2016/0246138 A1 | 8/2016 | Tang | |

FOREIGN PATENT DOCUMENTS

| | | | |
|---|---|---|---|
| CN | 102253541 B | * | 11/2012 |
| CN | 102789104 A | | 11/2012 |
| CN | 103472637 A | | 12/2013 |

* cited by examiner

BLUE PHASE LIQUID CRYSTAL PANELS

BACKGROUND OF THE INVENTION

1. Field of the Invention

The present disclosure relates to liquid crystal display technology, and more particularly to a blue phase liquid crystal panel.

2. Discussion of the Related Art

Liquid crystal panels have been widely adopted in a variety of electronic devices, such as cellular phones, desktop computers, and notebooks. It can be understood that user demand may vary in different occasions. For instance, sometimes users may intend to share the display contents with others, and thus wide viewing angle is needed. In another example, users pay more attention in protecting privacy, and thus narrow viewing angle is needed. Thus, the liquid crystal panel is required to provide the transition between the wide viewing angle and narrow viewing angle.

In order to provide such transition, usually, dual backlight system may be adopted in liquid crystal panels. That is, the liquid crystal panel includes two kinds of backlight devices, wherein one is for the wide viewing angle and the other one is for the narrow viewing angle. However, this solution may increase the thickness of the liquid crystal panel, and thus is not suitable for the thin and light trend of liquid crystal panels.

SUMMARY

The object of the invention is to provide a liquid crystal panel capable of providing the transition between the wide viewing angle and the narrow viewing angle. In addition, the thickness of the blue phase liquid crystal panel may be decreased.

In one aspect, a blue phase liquid crystal panel includes: a plurality of pixel cells, each of the pixel cells comprises a display area and a viewing angle controlling area, the viewing angle controlling area comprises a plurality of first electrode pairs spaced apart from each other, and each of the first electrode pairs comprises a first pixel electrode1 and a first common electrode, the first pixel electrodes of all of the pixel cells are connected, and the first common electrodes of all of the pixel cells are connected; the display area include a plurality of second electrode pairs spaced apart from each other, each of the second electrode pairs comprises one pair of second pixel electrodes1 or one pair of second common electrodes, and the electrodes of the two adjacent second electrode pairs are different; and in a wide viewing angle mode, the first electrode pair of the viewing angle controlling area do not generate an electrical field, and in a narrow viewing angle mode, a vertical electrical field is generated between the first pixel electrode and the first common electrode of each of the first electrode pairs within the viewing angle controlling area, and horizontal electrical fields are generated in the display area both in the wide viewing angle mode and the narrow viewing angle mode.

Wherein further comprises a first substrate, a second substrate opposite to the first substrate, and blue phase liquid crystals between the first substrate and the second substrate, the second electrode pairs are arranged on the first substrate, and the two electrodes of the second electrode pairs are on the first substrate, and are opposite to each other along a vertical direction, and the two electrodes of the second electrode pairs are insulated from each other.

Wherein the first electrode pairs are arranged on the first substrate, the two electrodes of the first electrode pairs are arranged to be opposite to each on the first substrate along the vertical direction, and are insulated from each other, and insulation layers are respectively arranged between the two electrodes of the first electrode and the second electrode pairs.

Wherein one of the electrode of the first electrode pair is arranged on the first substrate, and the other electrode of the first electrode pair is arranged on the second substrate.

Wherein the first common electrodes within the viewing angle controlling area of the pixel cells connect with all of the second common electrodes within the display area;

when the blue phase liquid crystal panel is in the wide viewing angle mode, a voltage difference between the voltage applied from the driving circuit to the first pixel electrode and the common voltage have not exceeded a first voltage threshold such that no electrical field is generated between the first pixel electrode of the viewing angle controlling area and the first common electrode; when the blue phase liquid crystal panel is in the narrow viewing angle mode, the voltage difference between the voltage applied from the driving circuit to the first pixel electrode and the common voltage exceeds a second voltage threshold such that the vertical electrical field is generated between the first pixel electrode and the first common electrode; and wherein the first voltage threshold is not larger than the second voltage threshold.

Wherein all of the first pixel electrodes of the pixel cells connect with the driving circuit of the blue phase liquid crystal panel via a switch component; when the blue phase liquid crystal panel is in the wide viewing angle mode, the driving circuit controls the first pixel electrode not to obtain the input voltage via the switch component, or the driving circuit controls the first pixel electrode via the switch component to obtain the input voltage, but the voltage difference between the input voltage and the input voltage obtained by the first common electrode has not exceed the first voltage threshold such that no electrical field is generated between the first pixel electrode and the first common electrode within the viewing angle controlling area; when the blue phase liquid crystal panel is in the narrow viewing angle mode, the driving circuit controls all of the pixel electrodes to obtain the input voltage, and the voltage difference between the input voltage and the input voltage obtained by the first common electrode is larger than a second voltage threshold, and the vertical electrical field is formed between the first pixel electrode and the first common electrode within the viewing angle controlling area; and wherein the first voltage threshold is not larger than the second voltage threshold.

In another aspect, a blue phase liquid crystal panel includes: a plurality of pixel cells, each of the pixel cells comprises a display area and a viewing angle controlling area; the viewing angle controlling area comprises a plurality of first electrode pairs spaced apart from each other, and each of the first electrode pairs comprises a first pixel electrode1 and a first common electrode, all of the first pixel electrodes of the pixel cells connect with a driving circuit of the blue phase liquid crystal panel via a switch component, the control end of the switch component connect with the corresponding scanning line of the pixel cell having the first pixel electrode connected with the switch component; the display area include a plurality of second electrode pairs spaced apart from each other, each of the second electrode pairs comprises one pair of second pixel electrodes1 or one pair of second common electrodes, and the electrodes of the two adjacent second electrode pairs are different; and in a wide viewing angle mode, no electrical field is generated by the first electrode pair of the viewing angle controlling area, and in a narrow viewing angle mode, a vertical electrical field is generated between the first pixel electrode and the first common electrode of each of the first electrode pairs within the viewing angle controlling area, and horizontal electrical fields are generated in the display area both in the wide viewing angle mode and the narrow viewing angle mode; wherein when the blue phase liquid crystal panel is in the wide viewing angle mode, the switch component receives the scanning voltage to control the first pixel electrode to obtain a first input voltage, a voltage difference between the first input voltage and the input voltage obtained by the first common electrode has not exceeded the first voltage threshold such that no electrical field is generated between the first pixel electrode and the first common electrode within the viewing angle controlling area; when in the narrow viewing angle mode, the switch component receives the scanning voltage from the scanning lines such that the connected first pixel electrode obtains a second input voltage, the voltage difference between the first input voltage and the input voltage obtained by the first common electrode is larger than the second threshold such that the vertical electrical field is generated between the first pixel electrode and the first common electrode within the viewing angle controlling area; and wherein the first voltage threshold is not larger than the second voltage threshold.

Wherein further comprises a first substrate, a second substrate opposite to the first substrate, and blue phase liquid crystals between the first substrate and the second substrate, the second electrode pairs are arranged on the first substrate, and the two electrodes of the second electrode pairs are on the first substrate, and are opposite to each other along a vertical direction, and the two electrodes of the second electrode pairs are insulated from each other.

Wherein the first electrode pairs are arranged on the first substrate, the two electrodes of the first electrode pairs are arranged to be opposite to each on the first substrate along the vertical direction, and are insulated from each other, and insulation layers are respectively arranged between the two electrodes of the first electrode and the second electrode pair.

Wherein one of the electrode of the first electrode pair is arranged on the first substrate, and the other electrode of the first electrode pair is arranged on the second substrate.

In another aspect, a blue phase liquid crystal panel includes: a plurality of pixel cells, each of the pixel cells comprises a display area and a viewing angle controlling area; the viewing angle controlling area comprises a plurality of first electrode pairs spaced apart from each other, and each of the first electrode pairs comprises a first pixel electrode1 and a first common electrode, wherein in a wide viewing angle mode, no electrical field is generated by the first electrode pair of the viewing angle controlling area, and in a narrow viewing angle mode, a vertical electrical field is generated between the first pixel electrode and the first common electrode of each of the first electrode pairs within the viewing angle controlling area, and horizontal electrical fields are generated in the display area both in the wide viewing angle mode and the narrow viewing angle mode.

Wherein the display area include a plurality of second electrode pairs spaced apart from each other, each of the second electrode pairs comprises one pair of second pixel electrodes1 or one pair of second common electrodes, and the electrodes of the two adjacent second electrode pairs are different.

Wherein further comprises a first substrate, a second substrate opposite to the first substrate, and blue phase liquid crystals between the first substrate and the second substrate, the second electrode pairs are arranged on the first substrate, and the two electrodes of the second electrode pairs are on the first substrate, and are opposite to each other along a vertical direction, and the two electrodes of the second electrode pairs are insulated from each other.

Wherein the first electrode pairs are arranged on the first substrate, the two electrodes of the first electrode pairs are arranged to be opposite to each on the first substrate along the vertical direction, and are insulated from each other.

Wherein insulation layers are respectively arranged between the two electrodes of the first electrode and the second electrode pairs.

Wherein one of the electrode of the first electrode pair is arranged on the first substrate, and the other electrode of the first electrode pair is arranged on the second substrate.

Wherein the first pixel electrodes of all of the pixel cells are connected, and the first common electrodes of all of the pixel cells are connected.

Wherein the first common electrodes within the viewing angle controlling area of all of the pixel cell connect with the second common electrodes within the display area;

when the blue phase liquid crystal panel is in the wide viewing angle mode, a voltage difference between the voltage applied from the driving circuit to the first pixel electrode and the common voltage have not exceeded a first voltage threshold such that no electrical field is generated between the first pixel electrode of the viewing angle controlling area and the first common electrode; when the blue phase liquid crystal panel is in the narrow viewing angle mode, the voltage difference between the voltage applied from the driving circuit to the first pixel electrode and the common voltage exceeds a second voltage threshold such that the vertical electrical field is generated between the first pixel electrode and the first common electrode; and wherein the first voltage threshold is not larger than the second voltage threshold.

Wherein all of the first pixel electrodes of the pixel cells connect with the driving circuit of the blue phase liquid crystal panel via a switch component; when the blue phase liquid crystal panel is in the wide viewing angle mode, the driving circuit controls the first pixel electrode not to obtain the input voltage via the switch component, or the driving circuit controls the first pixel electrode via the switch component to obtain the input voltage, but the voltage difference between the input voltage and the input voltage obtained by the first common electrode has not exceed the first voltage threshold such that no electrical field is generated between the first pixel electrode and the first common electrode within the viewing angle controlling area; when the blue phase liquid crystal panel is in the narrow viewing angle mode, the driving circuit controls all of the pixel electrodes to obtain the input voltage, and the voltage difference between the input voltage and the input voltage obtained by the first common electrode is larger than a second voltage threshold, and the vertical electrical field is formed between the first pixel electrode and the first common electrode within the viewing angle controlling area; and wherein the first voltage threshold is not larger than the second voltage threshold.

Wherein all of the first pixel electrodes of the pixel cells connect with the driving circuit of the blue phase liquid crystal panel via a switch component; when the blue phase liquid crystal panel is in the wide viewing angle mode, the driving circuit controls the first pixel electrode not to obtain the input voltage via the switch component, or the driving circuit controls the first pixel electrode via the switch component to obtain the input voltage, but the voltage difference between the input voltage and the input voltage obtained by the first common electrode has not exceed the first voltage threshold such that no electrical field is generated between the first pixel electrode and the first common electrode within the viewing angle controlling area; when the blue phase liquid crystal panel is in the narrow viewing angle mode, the driving circuit controls all of the pixel electrodes to obtain the input voltage, and the voltage difference between the input voltage and the input voltage obtained by the first common electrode is larger than a second voltage threshold, and the vertical electrical field is formed between the first pixel electrode and the first common electrode within the viewing angle controlling area; and wherein the first voltage threshold is not larger than the second voltage threshold.

In view of the above, each of the pixels of the blue phase liquid crystal panel includes a display area, and a viewing angle controlling area controlling a plurality of first electrode pairs. Each of the first electrode pairs includes a pair of a first pixel electrode and a first common electrode. When the wide viewing angle is required, the first electrode pair of the viewing angle controlling area may not generate the electric field, and thus is opaque. In addition, the display area may generate a horizontal electrical field providing wide viewing angle displaying. When the narrow viewing angle is required, the display area is displayed by the horizontal electric field. However, the first electrode of the viewing angle controlling area generates a vertical electric field such that the blue phase liquid crystals form the optical anisotropy along the vertical direction.

Thus, when the viewing angle is large, the viewing angle controlling field may have lateral light leakage and thus the viewing angle is narrow. In addition, the blue phase liquid crystal panel may transit between the wide viewing angle and the narrow viewing angle by configuring the viewing angle controlling area. The backlight system is not needed anymore, and thus the thickness of the blue phase liquid crystal panel may be maintained, which contributes to the light and thin design of the display panel.

DETAILED DESCRIPTION OF THE EMBODIMENTS

Embodiments of the invention will now be described more fully hereinafter with reference to the accompanying drawings, in which embodiments of the invention are shown.

Figure 1:
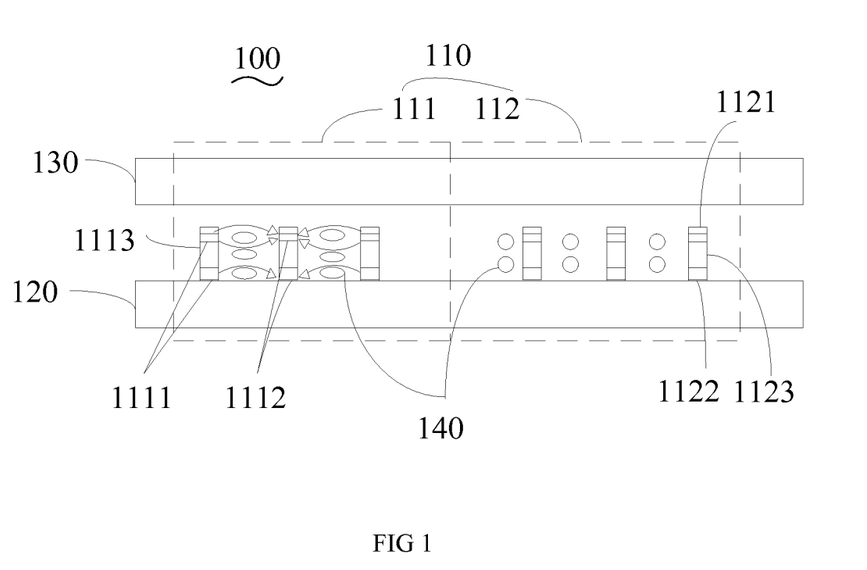
FIG. 1 is a schematic view of the blue phase liquid crystal panel in wide viewing angle in accordance with one embodiment.
Figure 2:
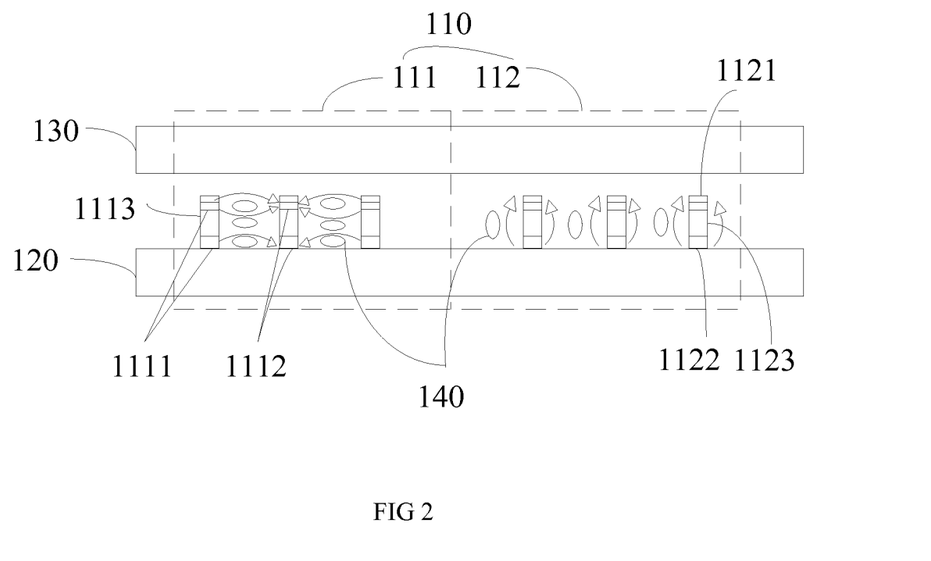
FIG. 2 is schematic view of the blue phase liquid crystal panel in narrow viewing angle in accordance with one embodiment.

FIG. 1 is a schematic view of the blue phase liquid crystal panel in wide viewing angle in accordance with one embodiment. FIG. 2 is schematic view of the blue phase liquid crystal panel in narrow viewing angle in accordance with one embodiment. The blue phase liquid crystal panel 100 includes a plurality of pixel cells 100. Each of the pixel cells 100 includes a display area 111 and a viewing angle controlling area 112. The viewing angle controlling area 112 includes a plurality of first electrode pairs spaced apart from each other, and each of the first electrode pairs includes a first pixel electrode 1121 and a first common electrode 1122. As the first pixel electrode 1121 and the first common electrode 1122 are different electrodes, when different voltages are respectively applied to the first pixel electrode 1121 and the first common electrode 1122, each of the first electrode pairs generates vertical electrical field.

In the embodiment, the blue phase liquid crystal panel 100 may have a wide viewing angle mode and a narrow viewing angle mode. As shown in FIG. 1, when in the wide viewing angle mode, the display area 111 generates the horizontal electrical field, and the blue phase liquid crystals 140 within the display area 111 are affected by the horizontal electrical field. The first pixel electrode pair 1121, 1122 within the viewing angle controlling area 112 does not generate the electrical field. That is, the blue phase liquid crystals 140 of the viewing angle controlling area 112 are in the optical isotropy due to not being affected by the electrical field, and thus are opaque, which is referred to as dark state. As such, the display area 111 implements In-Plane-Switch (IPS) wide viewing angle display.

As shown in FIG. 2, in the narrow viewing angle mode, the display area 111 generates the horizontal electrical field. The blue phase liquid crystals 140 within the display area 111 are affected by the horizontal electrical field. The vertical electrical field is generated between the first pixel electrode 1121 and the first common electrode 1122 of each of the first electrode pairs within the viewing angle controlling area 112 so as to form the optical anisotropy for the reason that the blue phase liquid crystals 140 within the viewing angle controlling area 112 are affected by the vertical electrical field. Thus, when in the wide viewing angle mode, lateral light leakage may happen within the viewing angle controlling area 112 so as to implement the narrow viewing angle display.

Specifically, the blue phase liquid crystal panel also includes a first substrate 120, a second substrate 130, and blue phase liquid crystals 140 between the first substrate 120 and the second substrate 130. The first substrate 120 is opposite to the second substrate 130 to form the above pixel areas 110. The first electrode pair 1121, 1122 within each of the viewing angle controlling areas 112 are arranged on the first substrate 120. In addition, the two electrodes of the first electrode pair, i.e., the first pixel electrode 1121 and the first common electrode 1122, are arranged to be opposite to each on the first substrate 120 along the vertical direction, and the two electrodes are insulated from each other. In an example, an insulation layer 1123 is formed between each pair of the first pixel electrode 1121 and the first common electrode 1122.

Figure 3:
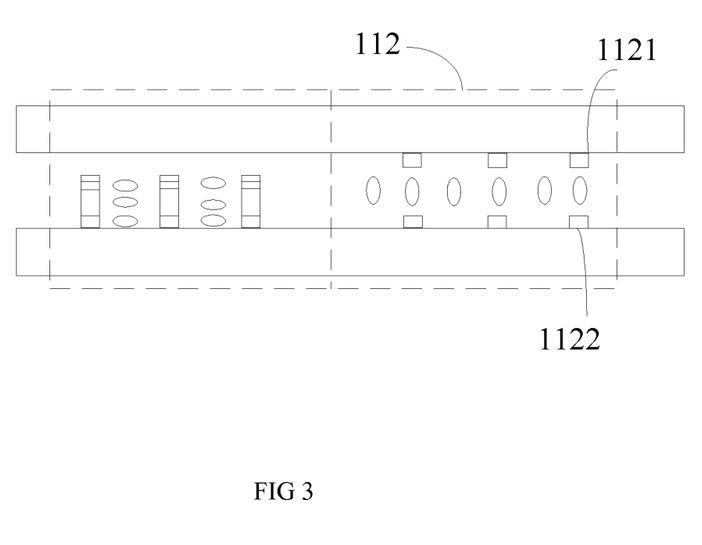
FIG. 3 is a schematic view of the blue phase liquid crystal panel in accordance with another embodiment.

In other embodiments, not all of the first electrode pair are arranged on the first substrate. As shown in FIG. 3, in one embodiment, the first pixel electrode 1121 is arranged on the first substrate, and the first common electrode 1122 is arranged on the second substrate. In addition, the first electrode pair may be configured in other ways as long as the vertical electrical field may be generated when the first electrode pair is applied with the voltage. It can be understood that the location of the first pixel electrode and the first common electrode may be configured in accordance with real scenarios. In various examples, the first pixel electrode 1121 of the viewing angle controlling area 112 may be arranged on the same substrate and the first common electrode 1122 may be arranged on another substrate. Alternatively, the first pixel electrodes 1121 may be arranged on the same layer of the substrate and the first common electrode 1122 may be arranged on another layer of the substrate.

In an example, in order to implement the horizontal electrical field of the display area 111, the display area 111 may include a plurality of second electrode pairs spaced apart from each other. Each of the second electrode pairs may be one pair of second pixel electrodes 1111 or one pair of second common electrodes 1112. In addition, the electrodes of the two adjacent second electrode pairs are different. That is, with respect to each of the second electrode pairs, the electrodes adjacent to the second pixel electrodes 1111 are second common electrodes 1112. As such, when the second pixel electrodes 1111 and the second common electrodes 1112 are applied with different voltages, the horizontal electrical field is generated between the adjacent second pixel electrodes 1111 and the second common electrodes 1112.

In the embodiment, the second electrode pairs are arranged on the first substrate 120. The two electrodes of each of the second electrode pairs, including the second pixel electrode 1111 and the second common electrode 1112, are opposite to each other along the vertical direction, and are insulated from each other. In the embodiment, the insulation layer 1113 is arranged between the two opposite electrodes along the vertical direction such that the two electrodes are insulated from each other.

Figure 4:
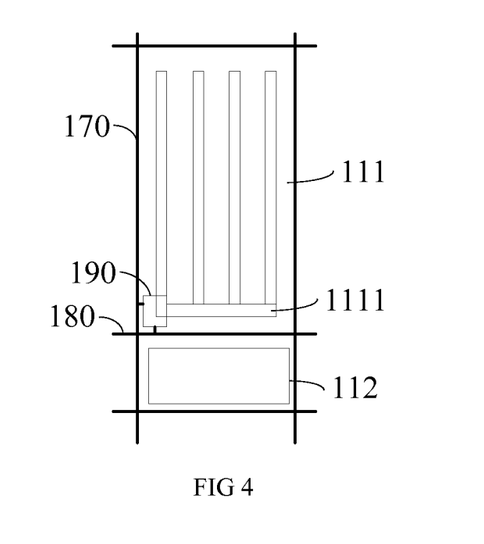
FIG. 4 is a schematic view of the blue phase liquid crystal panel in accordance with another embodiment.

In another embodiment, as shown in FIG. 4, the display area 111 and the viewing angle controlling area 112 of each of the pixel cells 110 are arranged along an up-down direction. Specifically, the first substrate also includes a plurality of data lines 170 and scanning lines 180. Each of the scanning lines 180 connects with one data line 170 via a switch component 190, such as the second pixel electrodes 1111 of the display area 111. In order to illustrate, FIG. 4 only shows the second pixel electrodes 1111 of the display area 111, but it can be understood that the display area 111 may include other components. When the scanning lines 180 input scanning signals, the switch components connected with the scanning line 180 control the connected second pixel electrodes 1111 to obtain the grayscale voltage inputted from the corresponding data line 170 so as to conduct the grayscale display of the display area 111. In other embodiments, the display area and the viewing angle controlling area of each of the pixel cells may be, but not limited to, arranged along a left-right direction.

Figure 5:
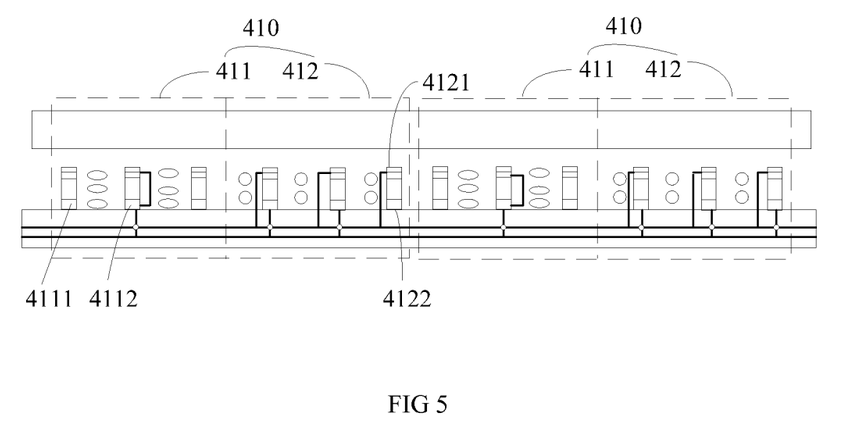
FIG. 5 is a schematic view of the blue phase liquid crystal panel in accordance with another embodiment.

FIG. 5 is a schematic view of the blue phase liquid crystal panel in accordance with another embodiment. It can be understood that only two pixel cells of the blue phase liquid crystal panel are shown as one example so as to clearly show the connection relationship between the electrodes of the blue phase liquid crystal panel.

Basing on the above embodiments, the pixel cell 410 includes a display area 411 and a viewing angle controlling area 412. The viewing angle controlling area 412 includes a plurality of first electrode pairs. Each of the first electrode pairs includes a first pixel electrode 4121 and a first common electrode 4122 opposite to the first pixel electrode 4121 along the vertical direction. The first pixel electrode 4121 and the first common electrode 4122 are insulated from each other. The display area 411 includes a plurality of second electrode pairs. Each of the second electrode pairs includes one pair of second pixel electrodes 4111 which are opposite to each other or one pair of insulated second common electrodes 4112 which are opposite to each other along the vertical direction. In addition, the electrodes of the two adjacent second electrode pairs are different.

In the embodiment, the first pixel electrodes 4121 of all of the pixel cells 410 on the blue phase liquid crystal panel are connected, and the first common electrodes 4122 of all of the pixel cells 410 are connected. When the blue phase liquid crystal panel implements the narrow viewing angle mode, the driving circuit of the blue phase liquid crystal panel inputs a first voltage to all of the first pixel electrodes 4121 within the viewing angle controlling area 412, and inputs a second voltage to all of the first common electrodes 4122. The second voltage is lower than the first voltage such that a voltage difference is formed between the first pixel electrode 4121 of each of the pixel cells and the corresponding first common electrode 4122. In this way, the vertical electrical field is formed within the viewing angle controlling area 412.

Further, the first common electrodes 4122 within the viewing angle controlling area 412 of all of the pixel cell 410 connect with the second common electrodes 4112 within all of the display area 411. When the blue phase liquid crystal panel conducts display operations, the driving circuit inputs a common voltage to all of the first common electrodes 4122 and the second common electrodes 4112, and inputs a driving voltage to the second pixel electrodes 4111 within the display area 411 of the scanned pixel cell 410 via the corresponding data line. As such, the voltage difference of corresponding grayscale is formed between the second pixel electrodes 4111 and the second common electrodes 4112. As the second pixel electrodes 4111 and the second common electrodes 4112 within the display area 411 are opposite to each other along the horizontal direction, the horizontal electrical field is formed. When the blue phase liquid crystal panel is in the wide viewing angle mode, the voltage difference between the voltage applied from the driving circuit to the first pixel electrode 4121 and the common voltage does not exceed a first voltage threshold such that the first pixel electrode 4121 of the viewing angle controlling area 412 and the first common electrode 4122 may not generate the electrical field. When the blue phase liquid crystal panel is in the narrow viewing angle mode, the voltage difference between the voltage applied from the driving circuit to the first pixel electrode 4121 and the common voltage exceeds a second voltage threshold. As such, the vertical electrical field is generated between the first pixel electrode 4121 of the viewing angle controlling area 412 and the first common electrode 4122.

Further, the first pixel electrode 4121 of all of the pixel cell 410 may be connected, and may be connected with the driving circuit of the blue phase liquid crystal panel via a switch component (not shown in FIG. 1), such as a TFT. The driving circuit may control whether the first pixel electrode 4121 obtains the input voltage. When the blue phase liquid crystal panel is in the wide viewing angle mode, the driving circuit controls the first pixel electrode 4121 not to obtain the input voltage via the switch component. Alternatively, the driving circuit controls the first pixel electrode 4121 to obtain the input voltage, but the voltage difference between the input voltage and the input voltage obtained by the first common electrode does not exceed the first voltage threshold. As such, there is no electrical field generated between the first pixel electrode 4121 and the first common electrode 4122 within the viewing angle controlling area 412. When the blue phase liquid crystal panel is in the narrow viewing angle mode, the driving circuit controls the first pixel electrode 4121 via the switch component to obtain the input voltage, and the voltage difference between the input voltage obtained by the first pixel electrode 4121 and the common electrode is larger than the second voltage threshold. As such, the vertical electrical field may be generated between the first pixel electrode 4121 and the first common electrode 4122 of the viewing angle controlling area 412.

In another embodiment, the first pixel electrodes of all of the pixel cells are not connected, and are connected with the driving circuit of the blue phase liquid crystal panel via a switch component, such as a TFT. The driving circuit is configured to respectively control each of the first pixel electrodes to obtain the input voltage. The control end of the switch component may connect with the corresponding scanning line of the pixel cell having the first pixel electrode connected with the switch component. When the scanning line inputs the scanning voltage to drive the corresponding display area to realize horizontal electrical field display, the switch component receives the scanning voltage to control the first pixel electrode of the viewing angle controlling area to obtain the first input voltage or the second input voltage. When in the wide viewing angle mode, the first pixel electrode obtains the first input voltage, and the voltage difference between the first input voltage and the input voltage obtained by the first common electrode does not exceed the first voltage threshold. As such, the electrical field may not be generated between the first pixel electrode and the first common electrode within the viewing angle controlling area. When in the narrow viewing angle mode, the first pixel electrode obtains the second input voltage. The voltage difference between the second input voltage and the input voltage obtained by the first common electrode is larger than the second threshold such that the vertical electrical field may be generated between the first pixel electrode and the first common electrode within the viewing angle controlling area.

The first voltage threshold and the second voltage threshold may be any values, and the first voltage threshold is not larger than the second voltage threshold. For instance, the first voltage threshold and the second voltage threshold are 0V, or the first voltage threshold is in a range of 0 and 2V, and the second voltage threshold is in a range of 5 and 20V. It can be understood that the first voltage threshold and the second voltage threshold are not limited to the above ranges. The first voltage threshold may be any values as long as the enough optical anisotropic may not be formed by the blue phase liquid crystals in the viewing angle controlling area. The second voltage threshold may be any values as long as enough optical anisotropic may be formed along the vertical direction by the blue phase liquid crystals in the viewing angle controlling area.

In the above embodiments, the first and the second pixel electrodes and the first and the second common electrodes may be brush-shaped. The second pixel electrode pairs and the second common electrode pairs may be two brush-shaped electrodes stacked via the insulation layer. In addition, the brush teeth of the second pixel electrode pairs and of the second common electrode pairs are spaced apart from each other. The first electrode pair includes a brush-shaped first pixel electrode and a brush-shaped first common electrode stacked via the insulation layer.

In view of the above, each of the pixel cells of the blue phase liquid crystal panel includes a display area and a viewing angle controlling area. The viewing angle controlling area includes a plurality of first electrode pairs. Each of the first electrode pairs includes one pair of the first pixel electrode and the first common electrode. When the wide viewing angle is required, there is no electrical field generated between the first electrode pair of the viewing angle controlling area, i.e., opaque, but the horizontal electrical field may be generated in the display area to realize the horizontal electrical field wide viewing angle display. When the narrow viewing angle is required, the display area is shown by horizontal electrical field. But the vertical electrical field is generated by the first electrode pairs of the viewing angle controlling area, such that enough optical anisotropy of vertical direction is formed by the blue phase liquid crystals. Thus, when the viewing angle is large, the viewing angle controlling field may have lateral light leakage and thus the viewing angle is narrow. In addition, the blue phase liquid crystal panel may transit between the wide viewing angle and the narrow viewing angle by configuring the viewing angle controlling area. The backlight system is not needed anymore, and thus the thickness of the blue phase liquid crystal panel may be maintained, which contributes to the light and thin design of the display panel.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A blue phase liquid crystal panel, comprising:
   a plurality of pixel cells, each of the pixel cells including a display area and a viewing angle controlling area;
   the viewing angle controlling area including a plurality of first electrode pairs spaced apart from each other, and each of the first electrode pairs including a first pixel electrode and a first common electrode;
   the display area including a plurality of second electrode pairs spaced apart from each other, each of the second electrode pairs including one pair of second pixel electrodes or one pair of second common electrodes, and wherein the electrodes of two adjacent second electrode pairs are different; and
   wherein in a wide viewing angle mode, no electrical field is generated by any of the first electrode pairs of the viewing angle controlling area, and in a narrow viewing angle mode, a vertical electrical field is generated between the first pixel electrode and the first common electrode of each of the first electrode pairs within the viewing angle controlling area, and horizontal electrical fields are generated in the display area both in the wide viewing angle mode and the narrow viewing angle mode;
   wherein when the blue phase liquid crystal panel is in the wide viewing angle mode, a switch component receives a scanning voltage to control the first pixel electrode to obtain a first input voltage, a voltage difference between the first input voltage and an input voltage obtained by the first common electrode has not exceeded a first voltage threshold such that no electrical field is generated between the first pixel electrode and the first common electrode within the viewing angle controlling area;
   wherein when in the narrow viewing angle mode, the switch component receives the scanning voltage from the scanning lines such that the connected first pixel electrode obtains a second input voltage, a voltage difference between the second input voltage and the input voltage obtained by the first common electrode is larger than a second voltage threshold such that the vertical electrical field is generated between the first pixel electrode and the first common electrode within the viewing angle controlling area;

wherein the first voltage threshold is not larger than the second voltage threshold;

wherein further comprises a first substrate, a second substrate opposite to the first substrate, and blue phase liquid crystals between the first substrate and the second substrate, the second electrode pairs are arranged on the first substrate, and the two electrodes of the second electrode pairs are on the first substrate, and are opposite to each other along a vertical direction, and the two electrodes of the second electrode pairs are insulated from each other; and wherein the first electrode pairs are arranged on the first substrate; the two electrodes of the first electrode pairs have a same width, are arranged to be opposite to each other on the first substrate along the vertical direction, and are insulated from each other; and island shaped insulation layers are respectively arranged between the two electrodes of the first electrode and the second electrode pairs.

* * * * *